United States Patent [19]
Jaeger et al.
[11] 3,711,835
[45] Jan. 16, 1973

[54] PROGRAM-CONTROLLED DATA TELECOMMUNICATION EXCHANGE SYSTEM AND METHOD FOR PRIORITY ASSIGNMENT OF OPERATING CYCLES

[75] Inventors: Hannes Jaeger, Icking; Walter Veprek, Munich, both of Germany

[73] Assignee: Siemens Aktiengesellschaft, Berlin and Munich, Germany

[22] Filed: July 24, 1970

[21] Appl. No.: 57,926

[30] Foreign Application Priority Data

Sept. 2, 1969 Germany....................P 19 44 483.8

[52] U.S. Cl...............................................340/172.5
[51] Int. Cl...............................................G06f 3/00
[58] Field of Search....................................340/172.5

[56] References Cited

UNITED STATES PATENTS

| | | | |
|---|---|---|---|
| 3,399,384 | 8/1968 | Crockett et al | 340/172.5 |
| 3,242,467 | 3/1966 | Lamy | 340/172.5 |
| 3,293,610 | 12/1966 | Epperson et al | 340/172.5 |
| 3,345,618 | 10/1967 | Threadgold | 340/172.5 |
| 3,395,394 | 7/1968 | Cottrell, Jr. | 340/172.5 |
| 3,500,329 | 3/1970 | Couleur et al | 340/172.5 |
| 3,543,246 | 11/1970 | Adams, Jr. | 340/172.5 |
| 3,553,656 | 1/1971 | Bernhardt | 340/172.5 |

*Primary Examiner*—Paul J. Henon
*Assistant Examiner*—Melvin B. Chapnick
*Attorney*—Birch, Swindler, McKie & Beckett

[57] ABSTRACT

A program controlled data dial exchange system and method for operating such a system in which data processing units connected to a central store preliminarily request a storage cycle assignment, and assignment takes place upon transmission of a second signal. A selection logic assigns cycles according to a normal permanently assigned priority or according to special selectable priorities. Traffic supervision means locate defects such as failure to operate in various parts of the system, and in conjunction with the selection logic the priorities of the cycle assignments are adjusted accordingly.

11 Claims, 4 Drawing Figures

PATENTED JAN 16 1973 3,711,835

SHEET 3 OF 4

PROGRAM-CONTROLLED DATA TELECOMMUNICATION EXCHANGE SYSTEM AND METHOD FOR PRIORITY ASSIGNMENT OF OPERATING CYCLES

BACKGROUND OF THE INVENTION

The invention relates to a system configuration and an operational process for a program-controlled data exchange system with a central store containing all data and programs necessary for the operation of the system and with data processing units working together therewith under the influence of central control devices according to the principle of request and "-proceed to send."

The invention herein is described in terms of a data processing mechanism for an exchange installation in a data transmission network, but the principles of the invention are equally applicable to more general data processing arrangements, such as that described in U.S. Pat. No. 3,399,384.

The principle of such a recently suggested, program-controlled data exchange system essentially resides in the fact that the assignment between the transmitters and the receivers, and thereby the message transmission, takes place by means of an information contained in an area assigned to each transmitter in the central store. This assignment comprises a binary code word identifying the desired receiver, which word is formed during the connection establishment of the dial informations and is recorded, over input code transducers, into the storage area assigned to the transmitter. The message transmission itself takes place in a manner such that with each incoming polarity change, a storage cycle of the central store is requested by the processing unit carrying out the transmission, with which the new information given through the polarity change is taken into the central store, and from there, with the aid of the stored binary address of the desired receiver, is again sent out over output code transducers.

In addition to the assignment between transmitters and receivers, the central store contains, as well, all further data and programs necessary for the operation of an exchange. To carry out the most varied types of tasks, a number of data processing units are available wherein in addition to a normal exchange of messages also all other accruing tasks can be disposed of. Each of these processing units can form a connection with the central store by means of which it requests from the store, according to the tasks to be performed by it, storage cycles with the aid of which information can then be exchanged with the central store.

It has been suggested to assign the storage cycles over a store request control to the requesting processing units. This measure is necessary because the described system must on one hand continuously process requests for storage cycles which may be arriving simultaneously, but on the other hand in each case only one request can be considered within a time interval.

In this circumstance, if a series of processing units which are independent from one another interact in the stated manner with the central store, though it can be avoided with the aid of the store request control that more than one cycle request is considered at any given time, such a distribution affords no possibility of considering cycle requests corresponding to specific actual time requirements existing by reason of the tasks to be carried out by the individual processing units.

In this connection it has already been suggested to interrupt for a certain period of time processes in another processing unit by requests which emanate from the processing unit carrying out the actual message transmission and to continue the interrupted processes only after the transmission of a polarity change has taken place.

The invention described herein is also concerned with the problem of providing means for carrying out the assignment of storage cycles to requesting processing units, and connected therewith also the supervision of the traffic of the individual processing units with the central store in a manner adapted to the system.

SUMMARY OF THE INVENTION

The aforementioned and other problems are solved according to the principles of this invention by having the processing units preliminarily request the assignment of a cycle through transmission of a first request signal to a store request control, and this preliminary request is stored there. The transmission of the cycle request to the store itself is released through the transmission of a second request signal and is acknowledged by the sending back of an acknowledgement signal to the requesting processing unit. The assignment of a storage cycle to a requesting processing unit takes place through a selection logic in the store request control either according to a normal priority permanently assigned to the processing units in each case related to their task in the system, or according to a special priority to be selected from case to case by each processing unit. Each request of higher special priority is treated prior to a request of lower priority, whereby the special priorities attainable by processing units lie in the scale of the normal priorities between the normal priorities permanently assigned to the processing units. A processing unit can select a special priority lying above its own normal priority, as well as one lying above the normal priority of other processing units. For the supervision of the traffic between processing units and the store request control on one hand, as well as store request control and store on the other hand, a supervision process, dependent on the priority of the requesting processing unit, as well as one depending on the selection of the requesting processing unit, is initiated in a supervision system of the store request control.

Accordingly a storage cycle request can, according to the principles of this invention, be influenced by two different measures. First, a processing unit can preliminarily announce within its normal priority a storage cycle request through transmission of a first request signal and can wait for a few system cycles until the actual transmission of the request into the store which is initiated with a second request signal. This means that during this time requests by other processing units have no effect on the system.

Secondly, a processing unit can leave its assigned normal priority and select a special priority. The preliminary announcement with a first, and the initiation of the transmission of the request into the store with a second request signal, thus, remains intact. However, a request with special priority precedes every other request, even if the requesting processing unit would have a low priority in a normal case.

BRIEF DESCRIPTION OF THE DRAWINGS

The invention will be best understood by reference to a description of a preferred embodiment and method of operating same given hereinbelow in conjunction with the drawings in which.

It has already been pointed out that it is an essential characteristic of the new data exchange system according to this invention that a series of processing units which operate independently from one another always interact with the central store in such a manner that after request and assignment of a storage cycle, they exchange information therewith. In referring to a central store reference is made to a memory of conventional construction, e.g., a core memory. A suitable core memory which may be used for this purpose is described in Bartee, Digital Computer Fundamentals, pages 220–224, published by McGraw-Hill, 1960. Of course, the selection of the number of memory cells and their particular arrangement will depend on the arrangement of the bits of information constituting the data words in the particular system used. According to the invention each processing unit is assigned a fixed priority corresponding to its task in the system, which in the following description is called "normal priority." For example in FIG. 1 five processing units VE1 to VE5 are shown, the permanently assigned normal priorities whereof are designated *np*1 to *np*5. To the processing unit VE1 available for the processing of the polarity changes coming from transmitters the highest normal priority *np*1 is assigned in the described example. In the continuing sequence of normal priorities following VE1 processing units VE2 and VE3 are available to process programs, and a processing unit VE4 is available carrying out traffic with external systems. Processing unit VE5 at the lower end of the normal priority scale can, for example, be a command field for the input of commands. Each cycle request by a processing unit with a higher priority is considered with preference by the store request control as compared to the requests by a processing unit with lower priority. It should be noted that each processing unit operates independently of the others, and each may make a cycle request at any arbitrary time.

It also is to be noted that, while the data processing system described herein is used in conjunction with a data communication exchange installation, the invention is useful with more general purpose data processing systems. Thus, the processing units described hereinabove, rather than being line connection units or the like, useful in telecommunication systems, may be the "individual equipments" described in U.S. Pat. No. 3,399,384. The principles of this invention are equally applicable to such an arrangement.

Figure 1:
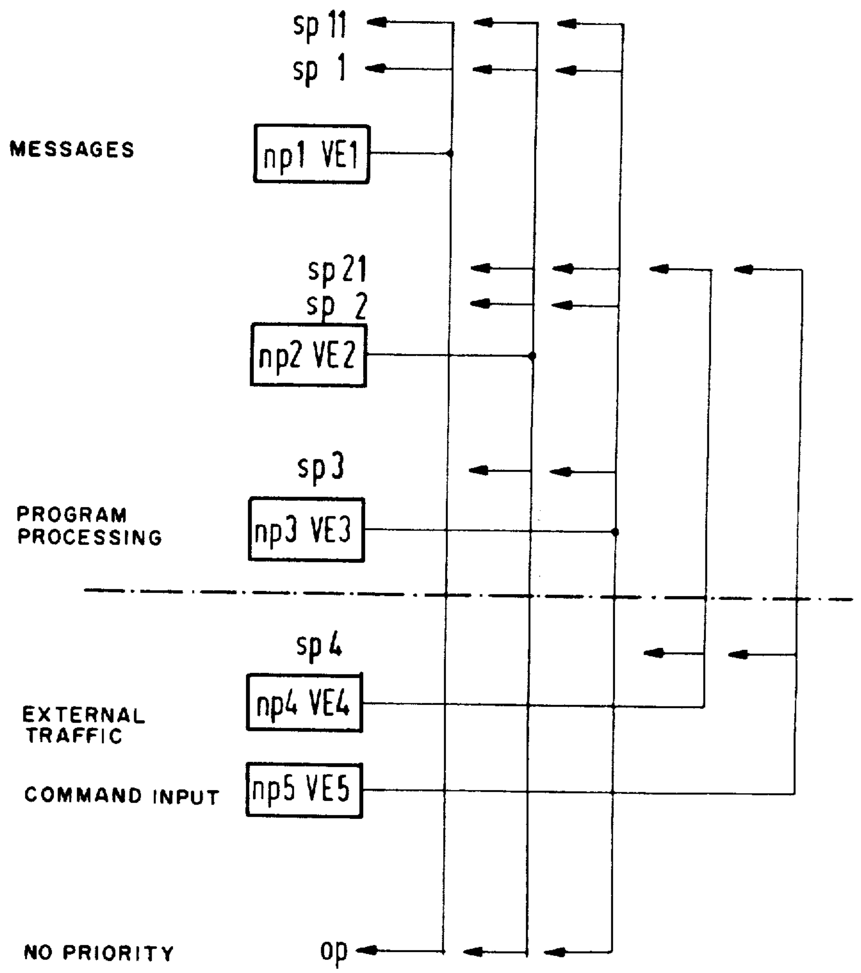
FIG. 1 is a chart showing a possible arrangement for the distribution of the normal priorities as well as the special priorities attainable by individual processing units.

However, in addition to the normal priorities a processing unit can select a special priority, if required, which, as a rule is placed above its normal priority. In FIG. 1 these special priorities are designated *sp*11 to *sp*4. Thus, for example, processing unit VE1 can reach two higher special priorities, i.e., *sp*11 and *sp*1. Accordingly, processing unit VE2 can reach special priorities *sp*11, *sp*1, *sp*21 and *sp*2. The further assignment is evident from FIG. 1. The special priorities designated by sp1, sp2, sp3 and sp4 in each case correspond to privileged requests for special operational cases. The special priorities designed *sp*11 and *sp*21 however represent priorities for cases where defects may occur. For example, the loss of operation of a portion of a processing unit or the entire loss of a processing unit is considered an error or defect. In such cases, there must be an immediate switch-over to a reserve or redundant processing unit. As is known in data processing technology, essential portions of processing units or the processing units themselves may be supplied in a redundant fashion so that reserves are always available. Thus, in the exemplary embodiment described herein, a program control unit is duplicatively present (VE2 and VE3). In the case of an error which appears in one of the more important processing units, e.g., in one of the program control units, or in the unit to which the lines are connected, i.e., VE1, the operational capability of the entire system is endangered. However, if a defect appears in one of the less important units, e.g., VE4 or VE5, then only a secondary activity is lost, and certainly, the operation of the entire system is not seriously endangered. In the former case, therefore, immediately after recognition of an error access to the store must be established in order to immediately initiate a specific program with which a switch-over from the defective unit to a properly functioning processing unit can be made. This must happen so rapidly that in the meantime no incorrect information can be exchanged. Thus, the most important processing units, i.e., VE1–3, have access to the highest special priorities *sp*11 and *ap*21 with which a cycle can be required before all other cycle requirements. It is, of course, possible to also assign to a processing unit a special priority which lies below its normal priority which is indicated in FIG. 1 by the fact that processing unit VE2 has, as well, access to special priority *sp*3. The further processing units VE3, VE4 and VE5 shown in FIG. 1 have access to special priorities in the manner shown by arrows in the drawing. Specific processing units can also have access to a stage without priority, which for example, are used for sub-ordinate programs, i.e., for programs having no time criterion. For this purpose FIG. 1 contains stage *op* (without priority), to which in the given example processing units VE1, VE2 and VE3 have access. If a processing unit requests a cycle with the condition "op" (without priority), a cycle is assigned to it only if none of the remaining processing units have requested a cycle. However, otherwise the invention is not restricted to the distribution of priority stages shown in FIG. 1.

Figure 2:
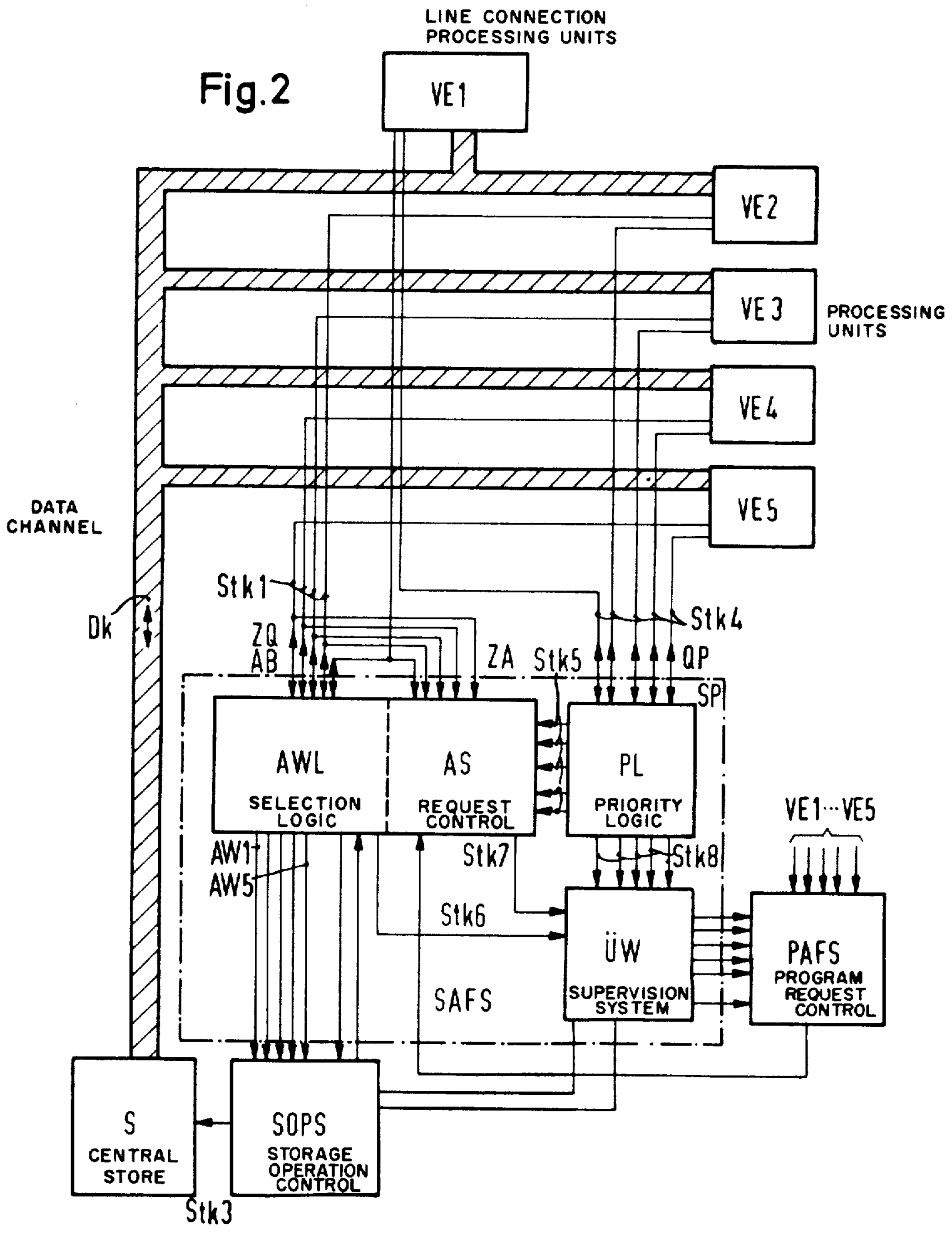
FIG. 2 is a block diagram of the system of the preferred embodiment showing the principle of interaction of several processing units with the central store under the control of the store request control.

To explain the interaction of the data processing units with a central store S, reference is made to FIG. 2. There again the five processing units VE1 to VE5 are shown, to which, as described in FIG. 1, on one hand normal priorities *np*1 to *np*5 are assigned, and which, on the other hand, can reach special priorities *sp*11 to *sp*4. Processing unit VE1, which is, for example, the line connection unit, i.e., the unit which receives the polarity changes of the transmitters and forwards them, after placing them into the store and receiving them again from the store, to the receivers, is the processing unit with the highest normal priority np1. Processing units VE2 and VE3, which in the order of rank, possess the next lower normal priorities *np*2 and *np*3, and are, for example, program control units which execute processes necessary for the operation of the exchange system, such as, for example, counting, supervision, etc. Processing units VE4, or VE5, possessing the next lower normal priorities *np*4 and *np*5, are, for example, external apparatus connection units, over which the system carries out traffic with connected external apparatus, such as, for example, recording systems, or command control systems for the input of commands.

The principle of the interaction between the individual processing units and the central store can be described, in summary, as follows. The processing units direct their requests for storage cycle distribution in the normal case, i.e., without special priority, in the form of first and second request signals ZA and AB over control channels *stk*1 to the store request control SAFS, where they are arranged in order, in a manner described hereinbelow, according to the normal priorities of the requesting processing units. If a processing unit desires a privileged storage cycle assignment and if a special priority is available to it, a signal *sp*, controlling the privileged assignment, is transmitted over control channels Stk4, noted in priority logic PL and supervised, and forwarded to store request control SAFS over control channels Stk5. Through the sending back of a signal QP (acknowledgement priority) the consideration of the special priority desire is acknowledged. The request itself then is again carried out through transmission of the request criteria ZA and AB which now, however, are processed according to the special priority *sp*. In each case the store request control SAFS forwards only one of the requests arriving over the control channels Stk1 to a storage operation control SOPS, from where the store S can be reached over a control channel Stk3. After the assignment of a storage cycle, there is available over data channel DK an information channel between the requesting data processing unit VE and the central store S for the exchange of information (data, programs or the like). The transmission of the request can at the same time be used to send back an acknowledgement signal ZQ to the requesting data processing unit.

To perform the above stated tasks, the store request control SAFS contains a selection logic designated AWL, a request control designated AS, a priority logic designated PL, and a supervision system designated UW. Each data processing unit has access to selection logic AWL and request control AS over control channel Stk1. Moreover, each data processing unit has also access to priority logic PL over control channel Stk4. While the request and assignment of storage cycles in the normal case, i.e., under consideration of the normal priorities permanently assigned to the individual processing units, always takes place only over the selection logic AWL and the request control AS, requests and assignments of storage cycles under consideration of the special priorities attainable by the individual processing units are always carried out over the priority logic PL, the request control AS and the selection logic AWL.

It should be noted that with the exception of details to be set forth hereinbelow the structural details of the various logic networks are conventional and may be designed or located by those skilled in the art, as needed, to perform the stated tasks.

Supervision system UW, which is connected over control channels Stk6 and Stk7 with selection logic AWL and request control AS, as well as over control channels Stk8 with priority logic PL, takes over, as will be described later with the aid of FIGS. *3a* and *3b*, the supervision of the traffic between the processing units VE and the store request control SAFS, as well as between the store request control SAFS and the store S.

With the aid of FIGS. *3a* and *3b* the structural details necessary for the comprehension of the invention are explained hereinbelow. Insofar as possible, the reference letters and numerals correspond to those of FIG. 2. As storage operation control SOPS is a part of the central store, only the central store is spoken of in the following description, for which, for reasons of clarity however, the designation SOPS is continued to be used. The storage operation control is merely a device of known construction through which communication with the central store takes place, and as is known, may comprise address, operation and word registers.

FIGS. *3a* and *3b* contain details of the parts of the store request control SAFS essential for carrying out the invention. These are priority logic PL, request control AS, selection logic AWL and supervision system UW.

First, the case shall be considered where processing units VE direct requests to the storage request control SAFS within the framework of their permanently assigned normal priorities (FIG. 1). To explain this process reference is made to FIG. *3a*. Since it is provided that no storage cycle request is to be treated in a privileged manner through a selected special priority, the first request criteria ZA1 to ZAs arriving from individual processing units over control channels Stk1, arrive in individual storage elements K1 to K5 of the request control AS. These storage elements may be of any of the conventional types now in use. A selection according to the normal priorities is carried out in the selection logic AWL over the selection switching means, which are, for example, gate switching means G1 to G5. At the same time over selection logic AWL, a signal is transmitted to the central store SOPS which indicates to it the request desire of a processing unit. A storage cycle assignment signal SPFREI indicating that the store is free is sent back from central store SOPS to store request control SAFS, after the second request signal AB has also arrived from the data processing unit which has already emitted the first request signal ZA. The request desire is transmitted, over one of selection lines AW1 to AW5, and transmission of a special takeover signal SPUE for store take-over to the store takes place. Simultaneously with the store take-over, an acknowledgement signal is transmitted to the requesting processing unit, and over gates GR1 to GR5 storage elements K1 to K5 in request control AS are reset. After the transmission of the request into the central store SOPS, the next request process can be initiated in the described manner in store requesting means SAFS.

Figure 3A:
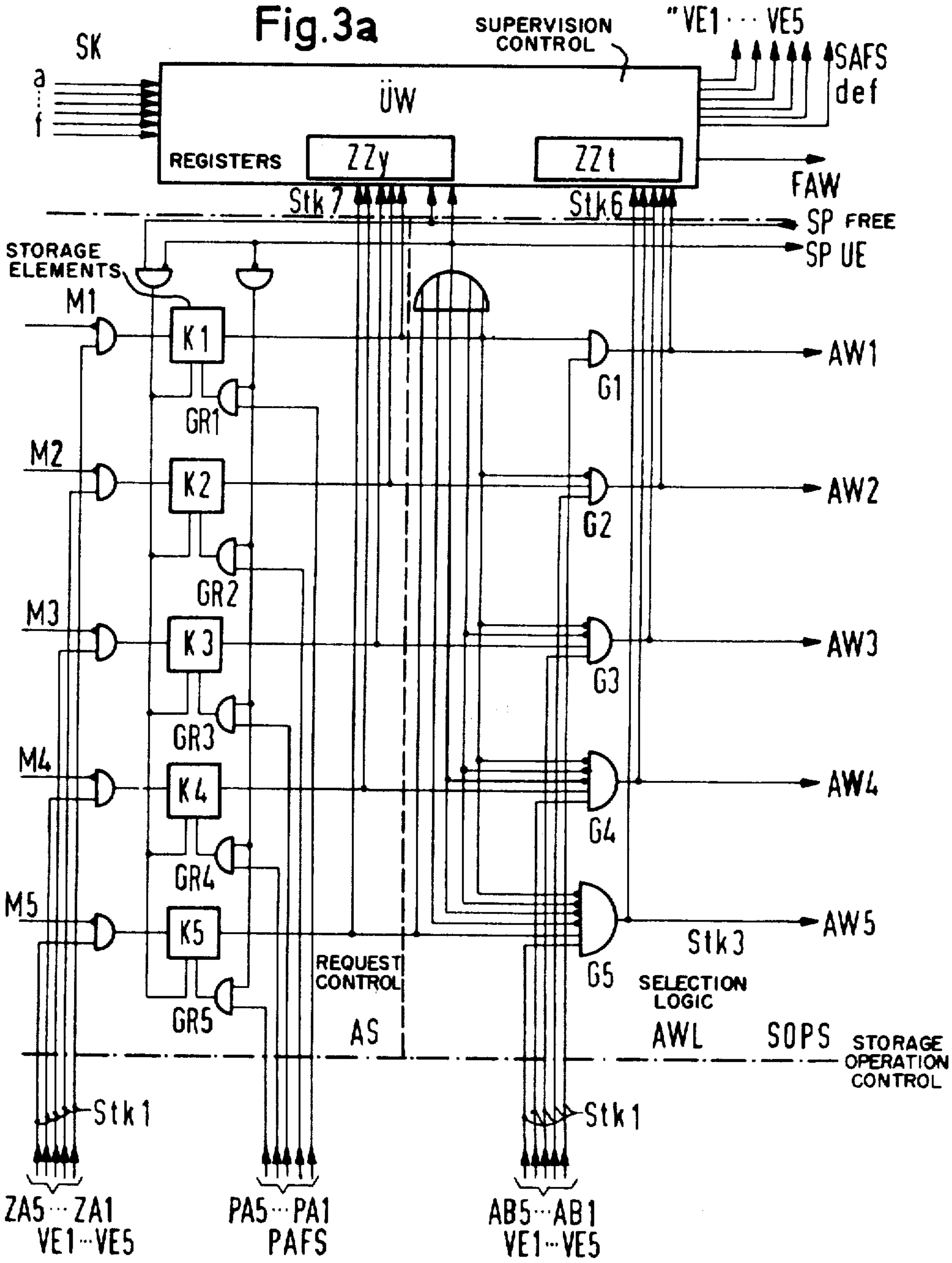
FIGS. 3*a* and 3*b* are schematic diagrams showing further details of the store request control.
Figure 3B:
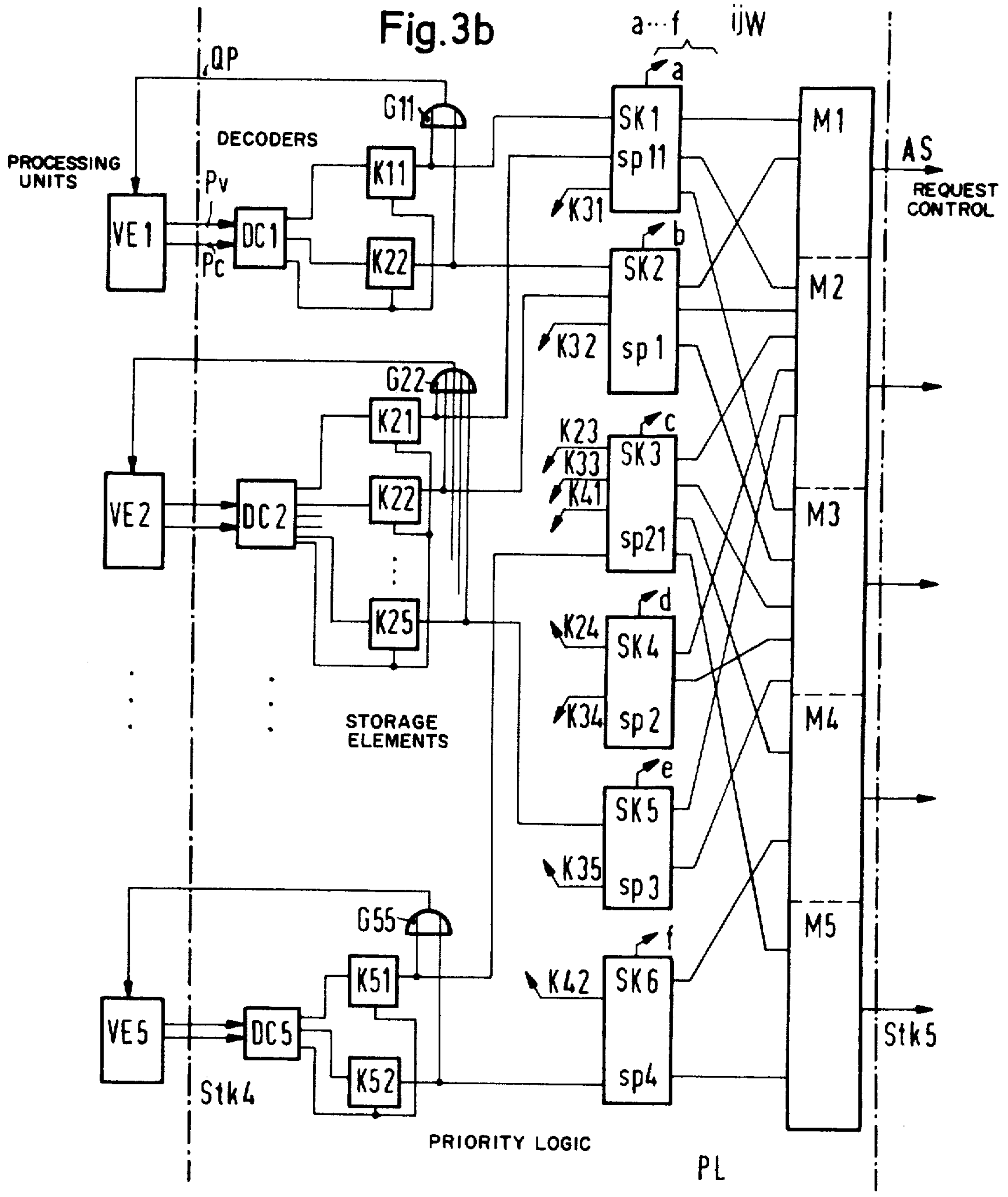

Secondly the system configuration and operation will be described for when a processing unit makes a cycle request not according to the normal priority permanently assigned to it, but according to a special priority attainable by it. To explain this procedure in addition to FIG. 3*a*, FIG. 3*b* is also referred to as well. By reason of the selected special priority the requesting data processing unit VE obtains privileged treatment of its storage cycle request. For this the priority logic PL is available in store request control SAFS to which all processing units which are able to reach a special priority have access over control lines Stk4. A special priority desire expressed by one of processing units VE1 to VE5 in the form of a binary signal (in FIG. 3*b* designated PC, PV), is detected in a decoding device DC1 to DC5 and noted in a storage stage K11 to K52 of priority logic PL. Again, these storage elements may be of any of the conventional types widely used for storing binary signals. The decoders DC1–5 may be any known device for recognizing a predetermined logic level signal, e.g., any simple voltage detector circuit can perform such a function. For example, simple voltage detectors capable of detecting predetermined step voltages may be used. The number of storage stages available per processing unit thereby corresponds to the number of special priorities attainable by the processing unit. The outputs of the individual storage stages are connected with the inputs of finder chain networks SK1 to SK6. The number of finder chains corresponds to the number of the special priorities which are provided in the system. According to the organizational plan shown in FIG. 1, in the example of FIG. 3*b* the finder chain SK1 corresponds to special priority *sp*11, the finder chain SK2 to special priority *sp*1, etc. The classification of the asynchronously arriving special priority requests takes place in priority logic PL on one hand corresponding to the timely sequence of their arrival, on the other hand corresponding to the natural sequence. The latter for the case that special priority desires of equal priority arrive simultaneously from several processing units. Classification in timely sequence means that a processing unit desiring a special priority obtains this immediately only if the special priority is not yet engaged. If the desired special priority is already engaged by another processing unit, this special priority is assigned to the processing unit which requested it later only after the first one has again left this special priority. The already mentioned finder chains SK1 to SK6 are provided for this purpose; in them the selection of requests, i.e., of the special priority desired takes place according to the well known ring counting principle.

Classification in natural sequence means that upon the arrival of equal rank special priority requests, which arrive at the same time from different processing units, the desired special priority is assigned first to that processing unit which has the highest normal priority among the requesting processing units. This has been illustrated in FIG. 3*b* by the fact that to processing unit VE1, which according to the organizational plan selected for this example, possesses the highest normal priority *np*1, the first input of finder chain SK1 is assigned. To the further processing units VE2 and VE3 seeking special priority *sp*11, in each case the succeeding inputs of finder chain SK1 are assigned. In case of the simultaneous arrival of special priority request *sp*11 from processing unit VE2 as well as from processing unit VE3, the request of processing unit VE2 is first considered. If, however, after the disposition of the first request (from VE2), or still prior to the disposition of the second request (by VE3) a request from processing unit VE1 would arrive, it would, nevertheless, have to wait for the disposition or retraction of the request by processing unit VE3, as in this instance the finder chain, according to the ring principle, first must reach its starting position again. As suggested by the foregoing discussion, conventional ring counters are used and an example of a suitable ring counter is to be found in British Pat. No. 1,086,576.

The outputs of the finder chains are connected with a connection network, which comprises, for example, gating circuits M1 to M5. The outputs of the connection network are connected over the control channels St5 with request control AS in such a way that a storage cycle assignment requested by a processing unit by transmission of the first request signal ZA is intermediately stored in the request control AS only if it occurs in coincidence with the special priority requested by it. Thus, if a special priority request by a processing unit exists then, corresponding to the rank of this special priority request, the request control AS is blocked for all requests with a priority lower than that of the special priority. The further program in the request control AS and in the selection logic AWL then proceeds essentially in the already described manner, i.e., the cycle request received in storage elements K1 to K5 of the request control AS is forwarded to the selection logic AWL, is evaluated there in the selection switching means G1 to G5 and forwarded over one of selection lines AW1 to AW5 to the central store SOPS. The receipt of assignment signal SPFREI and the transmission of the take-over signal SPUE, as well as the transmission into the store, also takes place in a manner already described.

A processing unit expressing a special priority desire can retract it at any time by a special signal (for example "0000"). In this case this command is also transmitted in binary code, recognized in decoding means DC1 to DC5 of the priority logic PL and used for the resetting of all storage stages K11 to K52 thereby affected. Priority logic PL is then immediately available again. In order to be able to communicate to a processing unit the fact that a special priority desire expressed by it was in fact recorded, an acknowledgement signal QP is sent back to the processing unit over the control channels Stk4.

It is, of course, possible within the scope of this invention to utilize, instead of the finder chains operating according to the known ring principle, shown in FIG. 3*b*, other finder principles.

It would equally be possible to communicate a special priority request, not in binary code, but, for example, over an individual special priority line to the priority logic. This would then have the advantage that the special priority requests could be evaluated geometrically, or without a special logical connection.

The priority-dependent assignment of storage cycles by reason of the request signals arriving from processing units, according to the invention, as described heretofore, signifies that a request with higher priority, be it a higher normal priority or a special priority, blocks every request with lower priority. However, the same also is true if a processing unit preliminarily announces a cycle assignment through the transmitting of the first request signal and, as indicated waits for some system cycles before the transmitting of the second request signal. Under certain circumstances, through the request at a single processing unit, the program in the system can be blocked for a disproportionally long period of time in both cases. The requirement results therefrom to provide special supervision processes with which not only this faulty loading of the system is detected and avoided, but which in addition offer the possibility of being able to detect the processing unit causing the defect.

According to a development within the framework of the invention there is for this reason a time and a cycle supervision provided in store request control SAFS. In FIG. 3*a* the system provided for time supervision is designated by ZZt and that provided for cycle supervision by ZZy. The elements ZZt and ZZy constitute the only parts of system UW pertinent to the invention described herein, and accordingly, these are the only portions of this system which are described in detail herein. Both systems are available in supervision system UW, forming a part of store request control SAFS.

Because the arrival of a first request signal ZA, either according to the selected special priority or according to the normal priority assigned to the requesting processing unit, causes the blocking of all requests having a lower priority, and the transmission of a request to the store and thereby the making available of store request control SAFS for further requests takes place only after the arrival of the second request signal AB, actually each time difference between first and second request signals exceeding a cycle duration of the store signifies a faulty loading of the system. However, a faulty loading also exists if the complete request signal (ZA and AB) is present in the store request control SAFS and no cycle assignment signals SPFREI arrives. Alternatively, a faulty loading exists if the complete request signal (ZA and AB), as well as the cycle assignment signal SPFREI are present, and the take-over signal SPUE is not transmitted. While the first mentioned case concerns the traffic between the processing units VE1 to VE5 and store request control SAFS, the last mentioned cases concern the traffic between store request means SAFS and the store itself. Through time supervision circuit ZZt the traffic between the processing units and the store request control on one hand, and between the store request control and the store on the other hand is supervised. This is accomplished by setting a supervision time on a value permissible for each of the stated cases, and an alarm indicating a defect is released over supervision system UW if the time duration in each of the stated cases exceeds this value. It is best in this connection to make the time value adjustable and to thus achieve supervision adapted to all possibilities. Advantageously a counter system of any well known type, for example, constructed of a chain of flip-flop circuits can be used as time supervision system ZZt. Utilizing this arrangement, the first request signals ZA1 to ZA5, which are available over control channels StK7, are combined and, after such combination in an AND gate, with selection signals AW1 to AW6, which are available over control channel StK6, they are routed to the input of the aforementioned binary counter. The counter is then advanced whenever the first request signal is available, but when a selection signal AW1–5 is absent. If the binary counter attains a predetermined final value, then the error signal "SAFS defective" is transmitted. By combining this error signal at an AND gate with one of the signals which trigger the counting operation and which in FIG. 3*a* are coupled over control channels StK6, information can be had regarding the data processing unit that has not transmitted the second request signal. Thus, the signals "VE1 defective" and the like are formed. To supervise the traffic between the storage request control and the storage or the storage operation control, the signal SPFREE emanating from the storage and the signal SPUE transmitted to the storage, besides the signals available from the control channels, are weighted over logic gates and in the same manner cause the binary counter to be advanced. The reset signal for the counter is obtained by the logic AND interconnection of the aforementioned storage signals along with the selection signals. Because control channel *stk6*, over which time supervision system ZZt is connected with selection logic AWL, communicates information about the processing unit which in each case sends request signals, it is additionally possible to localize the appropriate processing unit which causes faulty loading. Accordingly, at the output of the supervision system UW there is available a defect signal "SAFS defect," as well as a defect signal "VE defect," for example "VE1 defect."

The previously mentioned cycle supervision circuit ZZy is provided for the supervision of an inadmissibly long blocking of the store request control SAFS by higher value request desires. It consists of a counter system, again, of well known construction, in each case permanently assigned to each processing unit and is also centrally available in supervision system UW. It determines the number of cycles which each processing unit receives in uninterrupted sequence. This can take place in a manner that the numerical registration of the counter system is increased by one position with each cycle assignment to a given processing unit if at the same time a further request signal by another processing unit is present. At the end of a specified number of cycles, a defect report is set which in turn is available in the form of "SAFS defect" as well as in the form of "VE defect," whereby the latter gives a definite indication about the just connected processing unit wherein for example the signal "VE1 defect" is transmitted.

In addition to these processes, supervising traffic between processing units VE and store request control SAFS on one hand, and store request control SAFS and the store on the other hand, the supervision system UW within the scope of the invention can take over further supervision processes by reason of the information available from priority logic PL and selection logic AWL. Thus, there is available over control channels Stk6 to the supervision system information about the selection which permits it for the case that one, or more than one request is selected to make a defect signal available. In FIG. 3*a* this defect signal is designated by "FAW" (defect selection).

Over the inputs to supervision system UW designated by *a* through *f* in FIG. 3*a*, which may be reached in the suggested manner over priority logic PL, finder chain supervision is possible. This is permitted by the fact that the time duration elapsing between the arrival of a special priority request and the assignment of this requested special priority to the processing unit is predetermined. In this case, as well, the signal "SAFS defect" is emitted after the elapse of a given and preferably settable time duration.

Over control line Stk7 connecting supervision system UW with request control AS it is finally also possible to continuously supervise the resetting of storage elements K1 to K5.

The said defect signals "SAFS defect" and "VE defect" arrive at a program request control PAFS not shown in FIG. 3, which forms a further part of the central control of the system. This is merely a register system for storing information as to the status of the entire system. The program request control is not described further herein in view of the fact that it has no real relationship to the invention. In the case of the described defects, defect signals are transmitted from there to request control AS of storage request control SAFS. In FIG. 3*a* these defect signals have been designated by PA1 to PA5. By means of logical switching means they have a blocking effect on request control AS. In addition to the blocking by a request of higher priority this is the second possibility of blocking of store request control SAFS for cycle requests emanating from processing units.

The preferred embodiment described hereinabove is considered to be only exemplary, and the details of the structural elements, their arrangement or their mode of operation may be changed within the scope of the appended claims.

We claim:

1. A program-controlled data exchange system having a central store containing all data and programs necessary for the operation of said system and a plurality of data processing units communicating with said central store under the control of a central control means in such a manner that said processing units transmit signals indicating cycle requirements to said central control means independently of each other and at arbitrary times, said cycle requirements being operated on in said central control means according to a normal priority sequence, each said processing unit having a normal priority permanently assigned thereto according to the task performed in said system, the rank of said normal priority for each said processing unit depending on the importance of said task, said processing units including means for transmitting signals indicating special priority cycle requirements, the exchange system comprising:

means in said data processing units for emitting a first request signal requesting a storage cycle in said central store, store request control means for receiving and storing said first request signal, means in said data processing units for transmitting a second request signal requesting a storage cycle, after said first request signal, means in said store request control means for coupling a storage cycle request to said central store on initiation of said first and second request signals and for acknowledging the transmission of a storage cycle request to said central store by transmitting an acknowledgement signal to the ones of said data processing units requesting a storage cycle, selection logic network means in said storage request control means for assigning storage cycles to requesting data processing units according to said normal priorities, upon occurance of said first and second request signals, and traffic supervision means for controlling signal traffic between said data processing units and said store request control means, and said store request control means and said central store responsive to the priority of the requesting data processing unit.

2. The system defined in claim 1, further comprising priority logic network means for receiving and storing special priority signals emitted from said data processing units, said priority logic network means being adapted to store said special priority signals until one of an indication of storage cycle assignment or an indication of termination of special priority status is received in said priority logic network means.

3. The system defined in claim 2 wherein said request control means includes a plurality of first storage elements, said selection logic network means includes a plurality of gate means and said priority logic includes a number of second storage elements for each said data processing unit corresponding to the number of special priorities available to each said data processing unit;

said system further comprising:

a plurality of finder networks corresponding to the number of special priorities available to the system, a connection network, said second storage elements being connected to said request control means by means of said finder networks and said connection network in such manner that a first request signal reaches one of said first storage elements only according to a predetermined special priority, said request control means being adapted to, in response thereto, produce an output activating only one of said gate means for the evaluation of a second request signal and at the same time blocking all other gate means thereby making available a store request signal, and means for transmitting said store request signal to said central store upon receiving a cycle assignment readiness signal from said store and said second request signal.

4. The system defined in claim 3, wherein the traffic supervision means comprises a time measuring means for supplying, after the elapse of a settable supervision time, a first signal, signaling an error in the times of arrival of said first and second request signals, as well as a second signal, containing an information about the condition of the just connected processing unit.

5. The system defined in claim 4 wherein said time supervision means includes means for setting an interval such that the supervision time embraces a maximum admissible time duration up to the existence of the complete storage cycle request, an interval up to the arrival of the cycle assignment signal and an interval up to the emission of a storage take-over signal.

6. The system defined in claim 3 wherein said traffic supervision means comprises per processing unit a counter means for counting the number of cycles assigned to a processing unit in uninterrupted sequence, and upon exceeding of a specific settable value supplies a first signal, signaling a defect, as well as a second signal containing information about the condition of the just connected processing unit.

7. The system defined in claim 6, wherein said meter means is adapted to increase its registration by one count with each storage cycle assignment to the processing unit assigned thereto, if at the same time a further request signal by another processing unit is present.

8. The system defined in claim 3 characterized by the fact said traffic supervision means is connected to said first storage elements so that a second signal indicating processing unit defect released in said supervision system blocks the ones of said first storage elements assigned to the data processing unit reported to be defective.

9. A method for operating a program-controlled data exchange system having a central store containing all data and programs necessary for operating said system, said system including a plurality of processing units which cooperate with said central store under the control of a central control means in such manner that said processing units transmit signals indicating cycle requirements to said central control means independently of each other and at arbitrary times, said cycle requirements being operated on in said central control means according to a normal priority sequence, each said processing unit having a normal priority permanently assigned thereto according to the task performed by the processing unit in said system, said normal priorities being ranked according to importance of the task, said processing units including means for transmitting signals indicating special priority cycle requirements, the method comprising the steps of:

transmitting, by the ones of said processing units having cycle requirements, first request signals to a storage request control means, storing said first request signals in said storage request control means, transmitting, by the ones of said processing units having cycle requirements, first and second request signals to a selection logic network in said storage request control means, sending, by said central store to said storage request control means, upon arrival of said second request signals in said selection logic network, a cycle assignment signal, transmitting, by said storage request control means, of a storage take-over signal and a selection signal determinative of the one of said requesting processing units having the highest priority to said central store upon transmission of said cycle assignment signal, switching off said cycle assignment signal during the communication of the cycle request of highest priority into said central store, said cycle assignment signal being switched on again only after the cycle request has been taken in to the store, extinguishing the cycle request having the highest priority and transmitting an acknowledgement signal from said storage request control means to the processing unit from which the cycle request having highest priority issued, and monitoring signal traffic between said processing units and said storage request control means, and between said storage request control means and said central store in accordance with the priority assigned to the requesting processing unit and dependent on the selection of the requesting processing unit.

10. The method defined in claim 9, wherein for a cycle requirement with higher priority, signals for special priorities are transmitted, the special priorities are selectable, as required, by each said data processing unit in such a manner that each request for higher priority is considered prior to a request for lower priority, and wherein said special priorities which may be requested by said data processing units rank between said normal priorities above the highest normal priority of cycle requirement, such that each data processing unit can select a special priority above the normal priority assigned thereto or a special priority above the normal priorities of other data processing units.

11. The method defined in claim 10, comprising the additional steps of:

storing special priority request signals in a priority logic network (PL) until either a storage cycle assignment is made or a signal indicating the termination of the special priority cycle requirement is coupled to said priority logic network, evaluating differing special priorities in accordance with their rank, and in the case of special priorities of equal rank in accordance with their time of arrival from said data processing units to determine which cycle requirement is of highest priority and is to be switched to a priority logic network output, transmitting a control signal responsive to said evaluating operation to a request control means (AS), and blocking, by means of said request control means, all requests for a storage cycle having a lower priority, said blocking occurring independently of the presence of a second request signal (AB).

* * * * *